United States Patent
Feng et al.

(10) Patent No.: US 8,090,084 B2
(45) Date of Patent: Jan. 3, 2012

(54) AUTOMATED CALL ROUTER FOR BUSINESS DIRECTORY USING THE WORLD WIDE WEB

(75) Inventors: Junlan Feng, Basking Ridge, NJ (US);
Mazin Gilbert, Warren, NJ (US);
Narendra Gupta, Dayton, NJ (US);
Gerald Karam, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1660 days.

(21) Appl. No.: 11/194,842

(22) Filed: Aug. 1, 2005

(65) Prior Publication Data
US 2007/0005584 A1    Jan. 4, 2007

Related U.S. Application Data

(60) Provisional application No. 60/595,404, filed on Jun. 30, 2005.

(51) Int. Cl.
*H04M 11/00* (2006.01)
*H04M 1/64* (2006.01)
*G06F 3/048* (2006.01)

(52) U.S. Cl. ............ 379/88.17; 379/88.13; 715/780
(58) Field of Classification Search ............ 379/88.17, 379/88.13
See application file for complete search history.

(56) References Cited

U.S. PATENT DOCUMENTS

| | | | |
|---|---|---|---|
| 5,729,452 A * | 3/1998 | Smith et al. | 701/29 |
| 5,742,668 A * | 4/1998 | Pepe et al. | 455/415 |
| 5,835,061 A * | 11/1998 | Stewart | 342/457 |
| 5,907,801 A * | 5/1999 | Albert et al. | 455/406 |
| 6,381,324 B1 | 4/2002 | Shaffer | |
| 6,404,877 B1 | 6/2002 | Bolduc | |
| 6,614,783 B1 | 9/2003 | Sonesh | |
| 6,670,968 B1 * | 12/2003 | Schilit et al. | 715/760 |
| 6,681,008 B2 | 1/2004 | Bolduc | |
| 6,760,746 B1 | 7/2004 | Schneider | |
| 6,775,285 B1 * | 8/2004 | Moles et al. | 370/392 |
| 6,870,828 B1 | 3/2005 | Giordano | |
| 6,990,495 B1 * | 1/2006 | Grason et al. | 1/1 |
| 7,272,637 B1 * | 9/2007 | Himmelstein | 709/217 |
| 7,418,382 B1 * | 8/2008 | Maes | 704/236 |
| 7,496,674 B2 * | 2/2009 | Jorgensen | 709/230 |
| 7,590,619 B2 * | 9/2009 | Hurst-Hiller et al. | 1/1 |
| 7,797,447 B1 * | 9/2010 | Schilit et al. | 709/245 |
| 2002/0082938 A1 | 6/2002 | Borger et al. | |

(Continued)

FOREIGN PATENT DOCUMENTS
DE     10234983 A1     2/2004

*Primary Examiner* — Joseph T Phan
(74) *Attorney, Agent, or Firm* — Greenblum & Bernstein, P.L.C.

(57) ABSTRACT

The embodiments include a system and a method for establishing a communication connection after searching the World Wide Web. The system can include a first communication device for forming at least one communication connection between the first communication device and a second communication device, search means adapted to accept a query, access means can be adapted to search and identify relevant phone number information using the query, and create at least one icon to link the first communication device to a relevant phone number included in the relevant phone number information identified by the query, and reformulate the query if no relevant phone numbers are identified during the search. The system also includes click-to-dial means adapted to establish at least one communication connection from the first communication device to the second communication device.

34 Claims, 3 Drawing Sheets

U.S. PATENT DOCUMENTS

| | | | |
|---|---|---|---|
| 2002/0123904 A1* | 9/2002 | Amengual et al. | 705/1 |
| 2002/0147578 A1 | 10/2002 | O'Neil et al. | |
| 2003/0140091 A1* | 7/2003 | Himmel et al. | 709/203 |
| 2003/0223571 A1 | 12/2003 | Dezonno | |
| 2004/0044747 A1* | 3/2004 | Trevor et al. | 709/217 |
| 2004/0122951 A1 | 6/2004 | Beck et al. | |
| 2006/0036748 A1* | 2/2006 | Nusbaum et al. | 709/228 |
| 2009/0228825 A1* | 9/2009 | Van Os et al. | 715/780 |
| 2010/0030578 A1* | 2/2010 | Siddique et al. | 705/3 |

* cited by examiner

AUTOMATED CALL ROUTER FOR BUSINESS DIRECTORY USING THE WORLD WIDE WEB

CROSS REFERENCE TO RELATED APPLICATIONS

The present application claims priority to co-pending U.S. Provisional Patent Application Ser. No. 60/595,404 filed on Jun. 30, 2005.

FIELD

The present embodiments relate generally to a search engine's ability to locate a match for a phone number when multiple matches exist and provide a click-to-dial connection.

BACKGROUND

To find a phone number, the standard practice is to either look up the number in yellow pages or search through the World Wide Web using a search engine like Google.

Phone companies have traditionally leveraged from the lucrative business of directory assistance for decades. For example, operator assistance can cost up to $2 per use using a live person of a computer operated system like "Tell Me®" voice recognition and search services.

A need exists for an automated process for locating phone numbers and providing a click-to-dial service using information from the World Wide Web. A need exists for a system and method that would apply to users interacting with the web, independent of any one network protocol or particular access device.

A need exists for an automated system that tracks a user request while interacting with a search engine that identifies phone numbers and packets of data, and routes the user to establish a phone connection.

The present embodiments meet these needs.

SUMMARY

The embodiments include a system, a method, and instructions on a computer readable media, for establishing a communication connection using click to dial means, after searching the World Wide Web to locate a relevant phone number or group of phone numbers.

The system can comprise a first communication device for forming at least one communication connection between the first communication device and a second communication device such as a cell phone. The system further can include search means, that is, search instructions on a computer readable medium, adapted to accept a query, and access means, which are access instructions on a computer readable medium which enable the searching and identification of relevant phone number information using the query, and then the creation of at least one icon to link the first communication device to a relevant phone number included in the relevant phone number information identified by the query, and also enable the reformulation of the query if no relevant phone numbers are identified during the search. The system also comprises click-to-dial means, which are click to dial instructions on a computer readable medium, adapted to establish at least one communication connection from the first communication device to the second communication device once a relevant phone number, or group of relevant phone numbers are located.

The method of the invention comprises the steps of, inputting a query into search means, retrieving links to web pages using the search means, retrieving relevant phone number information using the query, and linking to a relevant phone number in the relevant phone number information. Additionally, the method can include ranking the phone numbers based on the query based on a pre-established ranking system.

The method includes selecting at least one phone number from the relevant phone information and associating that relevant phone number with at least one click-to-dial icon. The click-to-dial icon can be activated by a user to establish a connection between a first communication device and a second communication device.

The invention can be a computer readable medium for accepting a query and retrieving links to document, searching through cached data using the query to identify relevant phone number information, and if there is no match then access the document identified by the link to identify relevant phone number information, creating a click-to-dial icon to link a first communication device to a relevant phone number included in relevant phone number information identified by the query, and reformulating the query when no match occurs during the search for the relevant telephone number. The computer readable medium can further comprise instructions for establishing the at least one communication connection from the first communication device to a second communication device.

BRIEF DESCRIPTION OF THE DRAWINGS

The detailed description will be better understood in conjunction with the accompanying drawings as follows.

Figure 1:
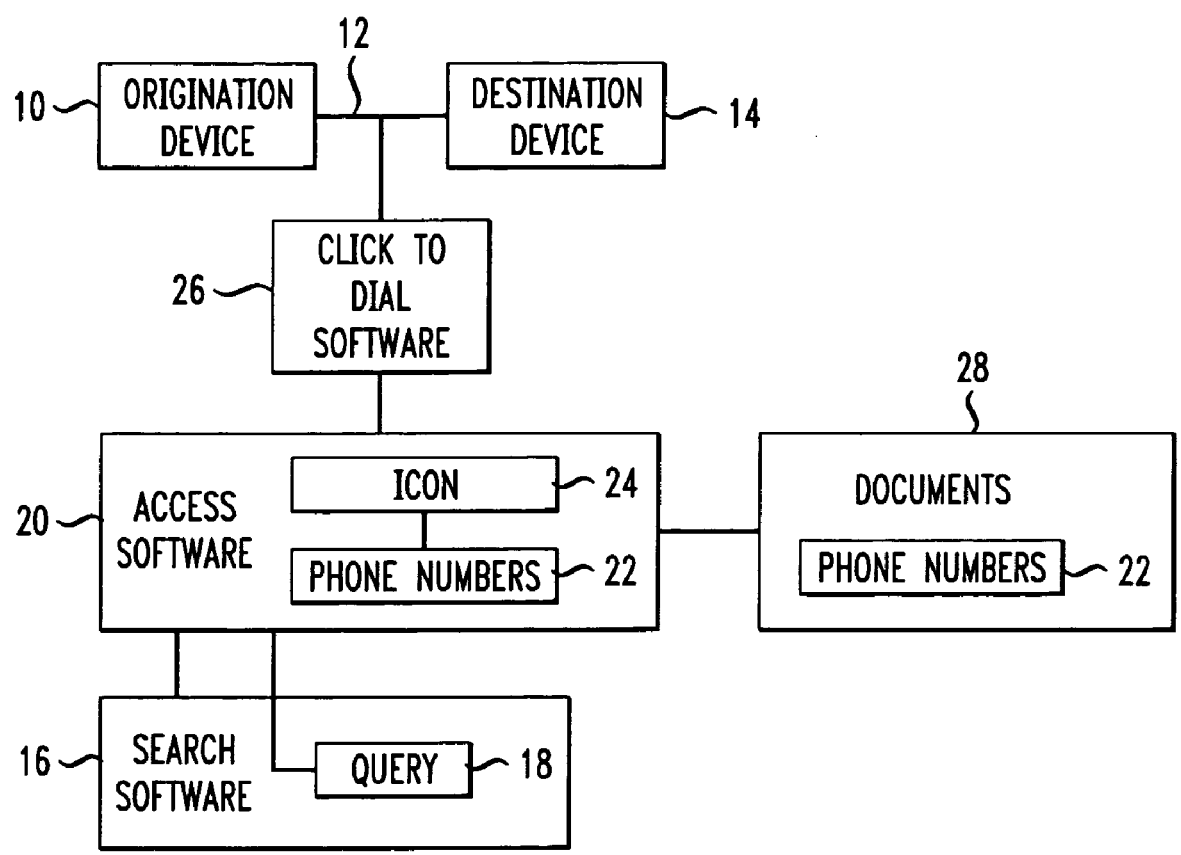
FIG. 1 depicts a diagram of an embodiment of the invention.

The present embodiments are detailed below with reference to the listed Figures.

DETAILED DESCRIPTION OF THE EMBODIMENTS

Before explaining the invention in detail, it is to be understood that the present embodiments are not limited to the particular embodiments disclosed and the invention can be practiced or carried out in various ways.

The embodiments of the invention include a system, a computer readable medium, and a method for quickly searching for a relevant phone number contained by searching relevant phone number information.

The invention is very user friendly and suitable for natural language searches. The embodiments can be integrated into a current search engine or can be a stand alone system for adding a click-to-dial feature to a search engine to establish a phone communication between a first communication device and a second communication device.

The embodiments of this invention can benefit businesses by quickly connecting customers to the correct person in a business with a fast search and one click connection. For example, it makes it easy for a first user of a cell service to contact another user of the same cell service. For example, if a company advertises a new product, customers often will search for the new product on the World Wide Web. If the customer wants to talk to some one about the product or order the product, the customer has had to search the business' website for the correct phone number. The embodiments instead, allow the customer to click on a click-to-dial icon linking a number in a document to the correct person at the business to handle the inquiry.

The embodiments differ from current search engines in that the automated software is trained to automatically locate language information or other portions of documents with relevant phone information, then extract the relevant phone numbers from the relevant phone information and establish a click-to-dial icon which enables a user to activate the communication link and make a call.

An embodiment of the invention can be a computer readable medium for accepting a query and retrieving links to document, searching for relevant phone number information using the query, creating a click-to-dial icon to link a first communication device to a relevant phone number included in relevant phone number information identified by the query, and reformulating the query when no match occurs during the search for the relevant telephone number. The computer readable medium can further comprise instructions for establishing the at least one communication connection from the first communication device to a second communication device.

An alternative embodiment of the invention can be for a system that establishes a communications connection using voice recognition software, handwriting recognition software, typed characters, mouse clicks or combinations thereof as an input to the system.

The system can comprise a first communication device, second communication device, search means which are instructions on a computer readable media, hereafter termed "search software", access means which are instructions on a computer readable media, which are hereafter termed "access software" and click-to-dial means, which are instructions on a computer readable media, and are hereafter termed "click-to-dial software".

It should be noted that two U.S. Pat. No. 6,870,828 and U.S. Pat. No. 6,404,877 which describe portions of the access software included herein are hereby incorporated by reference.

The first communication device can be used for forming at least one communication connection between the first communication device and the second communication device. The first communication device, the second communication device, or both the first communication device and the second communication device can be a computer, a personal digital assistant, a voice of internet protocol phone, a public switch telephone network phone, a cell phone, or combinations thereof. A computer such as an HP® Compaq® NC6000, a Nokia® wireless phone, a Blackberry®, a Palm Pilot™, or similar device.

The search software can be adapted to accept a query such as "AT&T phone problem". The search software can be a standard search engine such as Google®, a question and answer system such as AskJeeves®, an intelligent dialog system, or combinations thereof. The input to the search software can be in the form of text such as, keyword, or can be a spoken phrase, code input, natural language input, or combinations thereof.

The access software can be adapted to search for relevant phone numbers using the query to identify relevant phone information first. For example if the query was "AT&T phone problem" the click-to-dial icon can be connected to technical support, but if the query was "AT&T phone" the click-to-dial icon can be connection to the AT&T sales department. The access software can create at least one icon to link the first communication device to the relevant phone number identified by the query.

The search software can display links to documents, activating one of the links retrieves the document and then displays the document. When this occurs a click-to-dial link can be floating on the document retrieved. The floating icon can be in the form of a window displaying only the click to dial link, a link click-to-dial without a window, a link embedded in the retrieved document, or another way of displaying a link for any document. The phone number associated with the floating link can also change based on the content of the document that is displayed. For example, if the floating link was on the "home page" or "main page" and a user followed a link on the "home page" that took the user to the technical support page for the business the floating click-to-dial icon can change from being connected to a general operator at the business to a technical support consultant.

The click-to-dial icon can be a phone symbol, underlined text, bold text, different font from surrounding text, highlighted text, different color from surrounding text or combinations thereof. When implementing the embodiments, a single click-to-dial icon can be used for each document or multiple click-to-dial icons can be used for a single document, for example a document can have a phone symbol for one number and underlined phone number as the second number.

Often search software will retrieve two of the same document, when this occurs the access software uses the same click-to-dial icon for each document returned by the search software to limit the presentation to the user of multiples of the same phone number.

Next, the access software can perform a scan of documents retrieved by the search software The access software scans the retrieved documents identified by the search software for phone numbers listed in those documents and keywords identifying those phone numbers which were used in the query.

If phone numbers with keywords that match the words of the query are still not found, the access software reformulates the query using semantic (search for words with the same meaning) or syntactic (search for words with the same meaning) for relevant telephone numbers on the documents identified by the search software.

For example, if the query was for "AT&T phone problem", the search software would find documents that are related to the query. The access software can search cached data for phone number information or scan the documents for identifiers relative to the query. Continuing with this example, the access software can create a click-to-dial link to connect the first communication device to a second communication device at AT&T technical support and not an AT&T sales or a general AT&T number.

In scanning the documents, the access software can recognize phone numbers, can distinguish a region surrounding relevant phone numbers, and can search the region for identifiers relevant to the input query. Alternatively, the access software can recognize identifiers relevant to the input query, can distinguish a region surrounding the identifiers, and can search the region for phone numbers. The region can comprise phone number information which comprises phone numbers and identifiers. The identifiers can be industry standard code, toll free number, area code, numbers, words, properties that identify the phone number, title of the webpage, symbols, section heading, paragraph title or combinations thereof.

The access software can rank the phone numbers from relevant phone number information according the identity and the proximity between the query and the identifiers within the region. The identity can be the semantic or syntactic difference between the identifiers and the query, and the term proximity refers to the number of words away from a phone number, the coordinate distance of the phone number, or combinations thereof. The coordinate distance is a based on a measurement between the phone number and the identifiers, the coordinate distance can be measured in inches, meters, pixels, or other distance measurement. Proximity can be established by ranking a phone number by a scoring system. For example, a proximity 5 could mean the identifiers are next to the phone numbers; a proximity 3 could mean the identifiers are in the same line as the phone number and; a proximity 1 could mean the identifiers are on the same document as the phone numbers.

A phone number with the highest proximity ranking can be extracted and associated with the click-to-dial icon. When the scoring is completed and no phone numbers with scores above a preset threshold are found, the access software is designed to prevent a click-to-dial icon from being generated. In other words, when the system is not confident the phone number with the highest proximity score is the correct relevant phone number to provide to a user, a click-to-dial icon is not generated.

Relevant phone number information can comprise a relevant phone number and an identifier. The identifier can be a standard industry code, a toll free number, an area code, numbers, words, properties that identify the phone number, a title of a webpage, symbols, a section heading, a paragraph title or combinations thereof.

Relevant phone information can be cached as "cached data." Cached data can be updated with information provided by the customer or updated by scanning the identified documents. A date on the cached data to identify the last update to the document. The cached data can comprise a phone number, an identifier, a previous query, the date the cached data was stored, or combinations thereof.

A document owner can supply data to be cached, such as the relevant phone numbers, to the access software. The document owner might supply a list of phone numbers to the owner of the access software. These phone numbers can be the numbers to the sales department, technical support, marketing department or some other department within the company. A document owner can additionally supply identifiers to associate with the phone numbers. For example the document owner might want the words "problem", "does not work", or "broken" to be associated with the technical support number, the words "advertising" to be associated with the phone number of the marking department, and all other queries to be transferred to the sales department. Alternatively, the document can be searched for identifiers to associate with the phone numbers supplied. The documents can be web pages, advertisements, other multimedia documents or combinations thereof.

The click-to-dial software can establish at least one communication connection from the first communication device to the second communication device. When the second communication device is used in a call center at a business, the second communication device can accommodate multiple first communication devices. The first communication device can accommodate communication connections to multiple second communication devices. The communication connection can be through voice over internet protocol, public switch telephone network, or combinations thereof.

The provider of the access software can use this technology to generate payments. The payments can be received by the access software provider (for example, the owner of the search page) from the document provider (for example, the owner of a web site) when a communication connection is established to the document provider and the document provider is also the owner of the phone number.

In an alternative embodiment, payment can be received by the access software provider (for example, the owner of the search page) from a user conducting a search (for example, a customer) when a communication connection is established to the document provider and the document provider has not agreed to pay for a click-to-dial link to be associated with their documents.

The document provider will only have a click-to-dial link on their document if the document provider agrees to pay a royalty. Since some businesses do not want to receive calls if you are calling about something other than a sales call, the businesses can restrict the click-to-dial icon to only connect to the sales department. The document provider can provide phone numbers and even keywords related to the phone numbers; however, a search can still be done to extract additional keywords. If the document owner does not provide the phone numbers, the access software will extract the phone numbers.

Another embodiment of the invention is for a method of creating a communication connection from a first communication device to a second communication device that is quicker and easier to use with less actions to speak with a business than currently exist. The method for establishing a communication connection between a first communication device and a second communication device can comprise, accepting a query by search software, and retrieving links to documents using search software.

The method can comprise the step of retrieving relevant phone number information from cached data and comparing the relevant phone number information to the query using access software.

Another step can be searching for relevant phone number information on documents using the access software, wherein the searching for relevant phone number information occurs when there is no similarity between the relevant phone number information in the cached data and the query and ranking the relevant phone numbers based on the query. Another step can include linking to a relevant phone number in the relevant phone number information.

An additional step of the method can be associating the relevant phone number with at least one click-to-dial icon.

If the connection is lost, the click-to-dial icon can be reactivated in order to reestablish the communication connection between a first communication device and a second communication device.

The method can comprise the additional step of filtering the retrieved relevant phone numbers retrieved based on a user's special request, a region, a last updating of a document, type of document, language, combinations thereof. The type of document can be a word document, an xml document, a portable document file or any other type of document used on the World Wide Web, or combinations thereof.

The method can additionally comprise the step of updating cached data if cashed data is used, when the date of a retrieved document is newer than the date the data was stored as cached data.

The access software can limit the search of documents for phone numbers to specified levels. For example, a single page [A] might link to two pages [B] and [C] and page [B] might link to page [D] and [E]. Page [A] would be considered level 1; page [B] and page [C] might be considered level 2; and page [D] and page [E] might be considered level 3. The access software can limit a scan of retrieved documents to a specified number of levels, such that level 1 or levels 1 and 2 are searched. The use of levels to filter a search can reduce the time needed to scan every level before deciding what number to associate with the click-to-dial icon.

The method can comprise the step of receiving payment by the access software provider from an owner of a phone number when the click-to-dial icon is activated.

With reference to the figures, FIG. 1 depicts a diagram of an embodiment of the invention. A first communication device (10) can be used for forming at least one communication connection (12) between the first communication device (10) and a second communication device (14). A search software (16) can be adapted to accept a query (18).

An access software (20) can be adapted to search for relevant phone numbers (22) using the query. The access software can create at least one icon (24) to link the first communication device to a relevant phone number identified by the query.

A click-to-dial software (26) can be adapted to establish the at least one communication connection from the first communication device to the second communication device.

Figure 2:
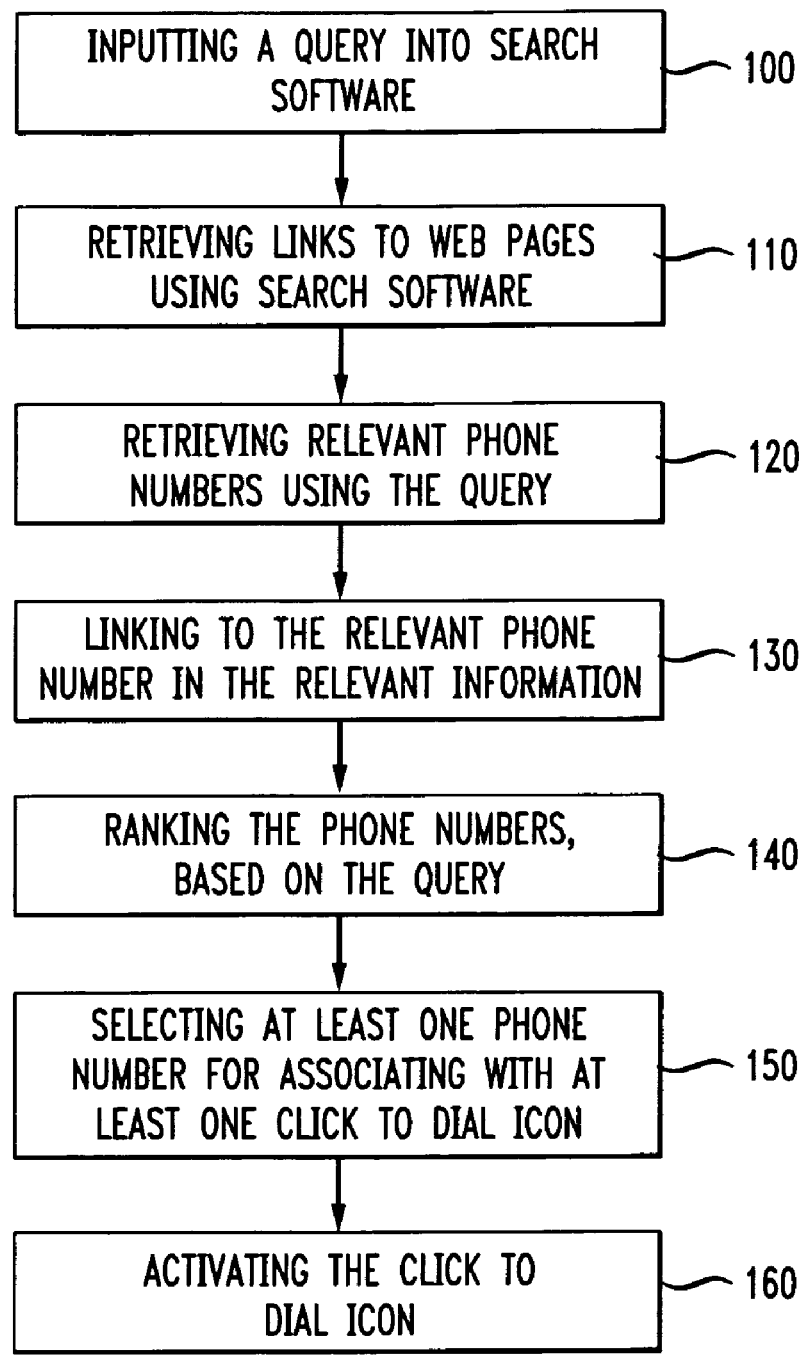
FIG. 2 depicts a flow chart of an embodiment of the method.

FIG. 2 depicts a flow chart of an embodiment of the method. The method for establishing a communication connection between a first communication device and a second communication device can comprise, accepting a query by search software [100], and retrieving links to documents using search software [110].

The method can comprise the step of retrieving relevant phone number information from cached data and comparing the relevant phone number information to the query using access software [120].

Another step can be searching for relevant phone number information on documents using the access software, wherein the searching for relevant phone number information occurs when there is no similarity between the relevant phone number information in the cached data and the query [130] and ranking the relevant phone numbers based on the query [140]. Another step can include linking to a relevant phone number in the relevant phone number information [150].

An additional step of the method can be associating the relevant phone number with at least one click-to-dial icon [160].

Figure 3:
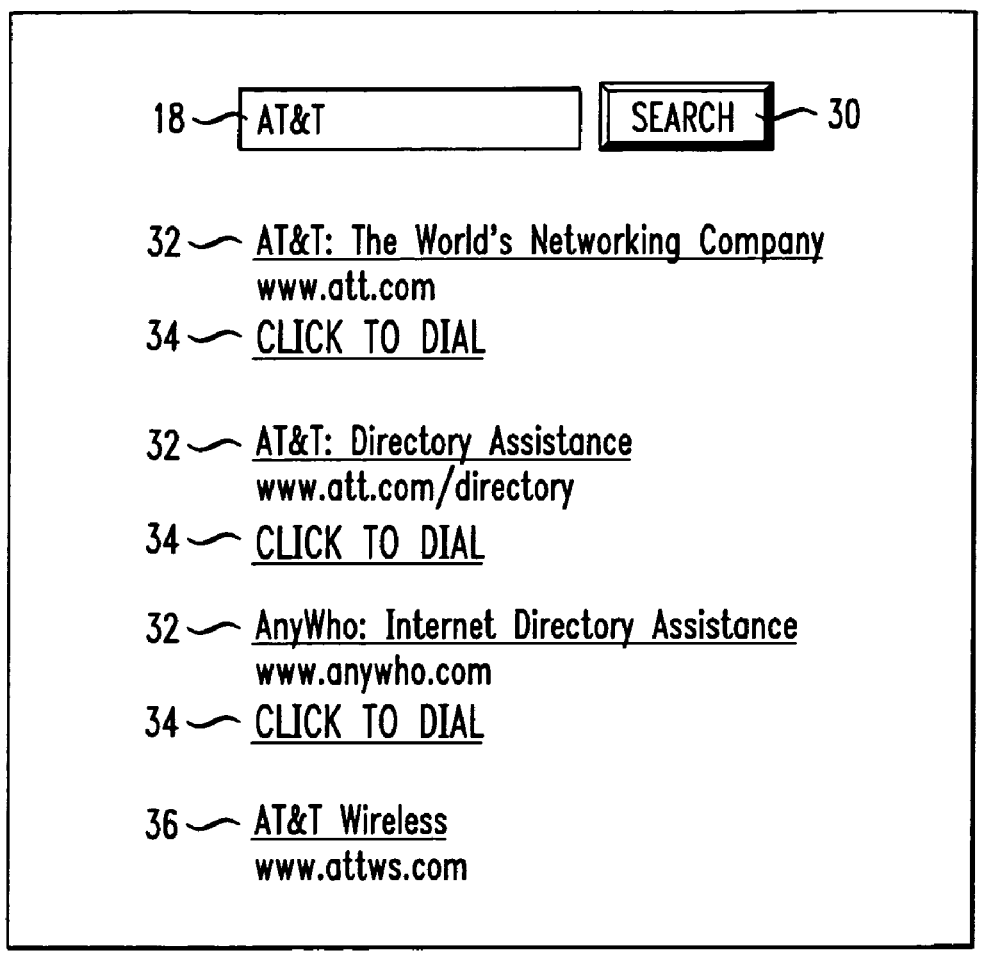
FIG. 3 depicts a representation of an embodiment of a click-to-dial icon for a specific document.

FIG. 3 depicts a representation of an embodiment of a click-to-dial icon useable herein. A query (18) for "AT&T" into a search field might return a document similar to that depicted in FIG. 3. When a search button (30) is activated, the links (32) are retrieved with their web address below. A click-to-dial icon (34) is shown below the web address. The access software created this click-to-dial icon (34) by searching for relevant phone numbers based on the query. The link (36) does not have a click-to-dial icon because either the query did not return any phone numbers that are relevant phone numbers, or if an owner does not agree to pay a royalty for participating in the click-to-dial search.

While these embodiments have been described with emphasis on the embodiments, it should be understood that within the scope of the appended claims, the embodiments might be practiced other than as specifically described herein.

What is claimed is:

1. A tangible computer readable medium on which are stored computer executable instructions that, when executed in a tangible computer processing node in a communications network:
   accept a query and retrieve a link to a document;
   search through cached data using the query to identify relevant phone number information, and if there is no match then access the document identified by the link to identify relevant phone number information;
   create a click-to-dial icon to link to a relevant phone number included in relevant phone number information identified by the query; and
   reformulate the query when no match occurs during the search for the relevant phone number.

2. The tangible computer readable medium of claim 1, wherein cached data is updated with information provided by a customer, updated by scanning the document when a date stamped on the cached data is older than a date of last update to the document, or combinations thereof.

3. The tangible computer readable medium of claim 1, the computer executable instructions, when executed further:
   establishing at least one communication connection.

4. The tangible computer readable medium of claim 3, wherein the at least one communication connection establishes a connection between a first communication device and a second communication device.

5. The tangible computer readable medium of claim 4, wherein the first communication device, the second communication device, or both the first communication device and the second communication device are a computer, a personal digital assistant, a voice over internet protocol phone, a public switch telephone network phone, a cell phone, or combinations thereof.

6. The tangible computer readable medium of claim 3 the computer executable instructions, when executed further:
   accepting payment by a computer readable medium provider from a document provider when a communication connection is established to the document provider.

7. The tangible computer readable medium of claim 3 the computer executable instructions, when executed further:
   accepting payment by a consumer when a communication connection is established to a document provider.

8. The tangible computer readable medium of claim 3, wherein the at least one communication connection is through a voice over internet protocol, a public switch telephone network, or combinations thereof.

9. The tangible computer readable medium of claim 3, wherein the at least one communication connection is an audio connection, a video connection, a multimedia connection or combinations thereof.

10. The tangible computer readable medium of claim 1, wherein the instruction for accepting a query and retrieving a link to a document is performed by standard search engine, a question and answering system, an intelligent dialog system, or combinations thereof.

11. The tangible computer readable medium of claim 1, wherein the query is in the form of a text query, a keyword, a spoken phrase, a natural language input, or combinations thereof.

12. The tangible computer readable medium of claim 1, wherein the instructions for accepting the query are: using voice recognition software, handwriting recognition software, typed characters, mouse clicks or combinations thereof.

13. The tangible computer readable medium of claim 1 the computer executable instructions, when executed further:
   scanning the documents to extract the relevant phone numbers and identifiers associated with the relevant phone numbers.

14. The tangible computer readable medium of claim 1, wherein the relevant phone numbers are supplied to the cached data by a document owner.

15. The tangible computer readable medium of claim 14, wherein the document owner supplies identifiers to associate with the relevant phone numbers.

16. The tangible computer readable medium of claim 14, wherein the document is searched for identifiers to associate with the phone numbers supplied.

17. The tangible computer readable medium of claim 1, wherein the document is a webpage, an advertisement, another multimedia document or combinations thereof.

18. The tangible computer readable medium of claim 1, wherein the relevant phone number information comprises: a relevant phone number and an identifier.

19. The tangible computer readable medium of claim 1, wherein the click-to-dial icon floats on the document when the document is retrieved.

20. A method for establishing a communication connection using a tangible computer processing node in a communications network, comprising:
accepting a query from a first communications device by search means;
retrieving a link to a document using the search means;
retrieving relevant phone number information from cached data and comparing the relevant phone number information to the query using an access means;
searching for relevant phone number information on documents using the access means, wherein the searching for relevant phone number information occurs when there is no similarity between the relevant phone number information in the cached data and the query;
ranking the relevant phone number information identified;
identifying a relevant phone number in the relevant phone number information; and
associating the relevant phone number with at least one click-to-dial icon.

21. The method of claim 20, wherein the cached data comprises a member selected from the group consisting of
a phone number, an identifier, a previous query, the date the cached data was stored and combinations thereof.

22. The method of claim 20, further comprising:
updating the cached data when the date of the document is newer than the date the cached data was stored.

23. The method of claim 20, wherein the retrieving of the relevant phone numbers is by scanning the documents identified by the search means.

24. The method of claim 20, wherein the access means recognizes relevant phone numbers limited by levels, proximity, coordinate distance or combinations thereof.

25. The method of claim 20, wherein the access means ranks the relevant phone numbers according to a semantic equivalent or a syntactic equivalent between relevant phone number information and the query.

26. The method of claim 20, wherein the access means enables the click-to-dial icon to be generated when a score associated with the relevant phone number is above a preset threshold.

27. The method of claim 20, wherein the relevant phone number information comprises:
a relevant phone number and an identifier.

28. The method of claim 27, wherein the identifier is selected from the group consisting of: a standard industry code, a toll free number, an area code, a number, a word, a property that identify the relevant phone number, a document title, a symbol, a section heading, a paragraph title and combinations thereof.

29. The method of claim 20, wherein the click-to-dial icon is a phone symbol, an underlined text, a bolded text, a font different from surrounding text, a highlighted text, a color different from surrounding text or combinations thereof.

30. The method of claim 20, further comprising:
filtering the relevant phone numbers based on:
a users special request, a region, a last updating of webpage, language, or combinations thereof.

31. The method of claim 20, further comprising:
receiving payment by an access means provider from:
an owner of a document when the click-to-dial icon is activated, a user of the search means when the click-to-dial icon is activated or combinations thereof.

32. The method of claim 20, further comprising:
activating the link,
wherein the click-to-dial icon is floating on the document retrieved.

33. A tangible computer processing node in a communications network for creating at least one click-dial-icon comprising:
a search means adapted to accept a query from a first communication device and retrieve a link to a document;
an access means, wherein the access means is adapted to:
search through cached data using the query to identify relevant phone number information, and if there is no match then access the document identified by the search means to identify relevant phone number information;
create at least one click-to-dial icon to link to a relevant phone number included in relevant phone number information identified by the query; and
reformulate the query when no match occurs during the search for the relevant phone number.

34. The tangible computer processing node in a communications network of claim 33, further comprising:
a click-to-dial means adapted to establish at least one communication connection from a first communication device to a second communications device.

* * * * *